US007399127B2

(12) United States Patent
Hirafuji et al.

(10) Patent No.: US 7,399,127 B2
(45) Date of Patent: Jul. 15, 2008

(54) AUTONOMOUS OPERATION CONTROL SYSTEM

(75) Inventors: Masayuki Hirafuji, Tsukuba (JP); Tokihiro Fukatsu, Tsukuba (JP)

(73) Assignee: Incorporated Administrative Agency National Agricultural and Bio-Oriented Research Organization, Tsukuba-shi (JP)

( * ) Notice: Subject to any disclaimer, the term of this patent is extended or adjusted under 35 U.S.C. 154(b) by 435 days.

(21) Appl. No.: 10/535,703

(22) PCT Filed: May 26, 2004

(86) PCT No.: PCT/JP2004/007531

§ 371 (c)(1),
(2), (4) Date: May 19, 2005

(87) PCT Pub. No.: WO2005/117441

PCT Pub. Date: Dec. 8, 2005

(65) Prior Publication Data

US 2006/0082651 A1 Apr. 20, 2006

(51) Int. Cl.

| | |
|---|---|
| ***G03B 17/00*** | (2006.01) |
| ***G03B 29/00*** | (2006.01) |
| ***G08B 13/18*** | (2006.01) |
| ***H04N 7/18*** | (2006.01) |

(52) U.S. Cl. ....................... 396/427; 396/429; 340/554; 348/154

(58) Field of Classification Search ................. 396/427, 396/429; 348/152–155, 159; 340/554
See application file for complete search history.

(56) References Cited

U.S. PATENT DOCUMENTS

| | | | | |
|---|---|---|---|---|
| 6,359,647 | B1 * | 3/2002 | Sengupta et al. | 348/154 |
| 7,124,427 | B1 * | 10/2006 | Esbensen | 725/109 |

FOREIGN PATENT DOCUMENTS

| | | | |
|---|---|---|---|
| JP | 2002-101408 | A | 4/2002 |
| JP | 2002-298261 | A | 10/2002 |
| JP | 2002-344957 | A | 11/2002 |
| JP | 2003-317168 | A | 11/2003 |
| JP | 2004-72628 | A | 3/2004 |
| JP | 2004-78921 | A | 3/2004 |

* cited by examiner

*Primary Examiner*—W. B. Perkey
*Assistant Examiner*—Rishi Suthar
(74) *Attorney, Agent, or Firm*—Foley & Lardner LLP

(57) ABSTRACT

A monitoring apparatus including a loudspeaker, a photographic camera that photographs image information on a photographic subject, a proximity sensor, and a monitoring control unit is disposed at a first remote location. An autonomous operation controller including an autonomous operation control unit is disposed at a second remote location remote from the first remote location. Under remote control of this autonomous remote controller, the monitoring apparatus performs photographing of the image information on the photographic subject and acquires the image information.

26 Claims, 7 Drawing Sheets

AUTONOMOUS OPERATION CONTROL SYSTEM

TECHNICAL FIELD

The present invention relates to an autonomous operation control system including an autonomous operation controller (a monitoring apparatus) that monitors a photographic subject at a remote location or the like, and more particularly, to an autonomous operation control system that can operate and acquire shooting of the photographic subject, such as image information, from other remote location.

BACKGROUND ART

A conventional method of acquiring image information of a remote location is to setup a camera on the spot and transfer the image information taken via a wired or a wireless scheme. The method of transferring the image information taken via the wired or the wireless scheme to acquire the image information of the remote location is referred to as "a remote technique", "a monitoring technique", "an Internet technique", or "a long-time monitoring technique" (hereafter, "autonomous operation control system", generically in this specification).

Specifically, as an image information transmitting method by the autonomous operation control system, a method of transferring images at intervals of constant cycles from a camera ("a monitoring camera method or an ftp method"), a method of allowing a user (an operator) to operate a photographic camera at a remote location, and transmitting a photographed image ("a remote control method or a web camera method"), a crime prevention apparatus-based method of transmitting a photographed image by mounting a computer on a photographic camera side on the site, making a determination based on information from a sensor and the like on the site, and performing automatic photographing, and the like have been conventionally adopted. Furthermore, as the autonomous operation control system of this type, a monitoring system using photographic images photographed by a monitoring camera is disclosed in, for example, Japanese Patent Application Laid-open No. 2004-078921.

However, the technique based on the autonomous operation control system using the image information acquired by the camera as explained above has following disadvantages. As the conventional photographic camera, an ordinary monitoring camera is used. Since this monitoring camera is constituted by adding only a microphone or a proximity sensor to a function of the monitoring camera, the camera basically functions merely as the monitoring camera.

Some monitoring cameras additionally include a temperature sensor that measures a temperature or an external sensor having another function. However, if a monitoring target (the photographic subject) is, for example, a weather observation apparatus, the camera is disadvantageously insufficient in the number of elements that the camera can measure and in measurement accuracy.

With a control method (photographing method) based on the conventional autonomous operation control system, it is difficult to appropriately grasp the photographic subject and, therefore, disadvantageously difficult to realize automation. In addition, if the operator or the like is responsible for all operations relating to photographing and the number of photographic subjects and the number of locations at which the photographic cameras are disposed increase, a heavy burden is disadvantageously cast on the operator.

Furthermore, to prevent the autonomous operation control system from malfunctioning, it is necessary that a monitoring apparatus that constitutes the photographic camera that actually perform photographing has an autonomous control function. To do so, it is necessary to incorporate a complicated and large-capacity program into firmware, and to also incorporate high-specification hardware necessary to execute the program into the firmware. This results in a disadvantageous and considerable increase in a cost of the monitoring apparatus. In addition, the more complicated the program is, the more so-called program bugs occur, resulting in lots of operations and labor required to perform debugging.

Moreover, if photographing is constantly continued so as to prevent photographic defect in a weather condition such as rain, unnecessary image information is then increased, and a cost of an image storage apparatus that constitutes the autonomous operation control system and a cost of a communication line are disadvantageously incurred. Furthermore, although it is necessary to dispose photographic cameras or monitoring cameras for photographing the photographic subject, it is disadvantageously difficult to dispose many monitoring cameras in a wide area such as a farm land in terms of cost. In addition, it is considerably difficult to secure communication lines following installation of the monitoring cameras in terms of both cost and technique.

The present invention has been achieved in order to solve the conventional problems. It is therefore an object of the present invention to provide an autonomous operation control system that can photograph image information or the like using a monitoring apparatus, and that can operate photographing of the image information or the like performed by the monitoring apparatus and acquire the image information from another remote location.

DISCLOSURE OF THE INVENTION

To solve the above problems and to achieve the object, an autonomous operation control system according to one aspect of the present invention includes a monitoring apparatus that is provided at a first remote location, and acquires image information on a photographic subject, the monitoring apparatus including a shooting unit that performs shooting of the photographic subject, a photographic-subject detecting unit that detects the photographic subject, and a signal generating unit that generates an alarm signal; and an autonomous operation controller that is provided at a second remote location, and remotely controls the monitoring apparatus. The autonomous operation controller includes a function of automatically operating the shooting unit and the signal generating unit based on photographic information acquired by the monitoring apparatus to photograph an image and generate a signal.

An autonomous operation control system according to another aspect of the present invention includes a monitoring apparatus that is provided at a first remote location, and acquires image information on a photographic subject, the monitoring apparatus including a shooting unit that performs shooting of the photographic subject, a photographic-subject detecting unit that detects the photographic subject, and a signal generating unit that generates an alarm signal; and an autonomous operation controller that is provided at a second remote location, and remotely controls the monitoring apparatus. A plurality of the shooting units is prepared in a photographic subject area. The shooting unit includes a function of collecting information on the photographic subject by, when one of a plurality of monitoring apparatuses detects a target that intrudes in the photographic subject area, photographing the target from multiple directions, tracking and monitoring the target, and zooming-in the photographic subject using a zoom lens.

The shooting unit of the autonomous operation control system according to the above aspect zooms in the target from the multiple directions using a zoom function, when the target that intrudes in the photographic subject area is detected.

The autonomous operation controller of the autonomous operation control system according to the above aspect automatically operates the shooting unit and the signal generating unit based on photographic data and signal data acquired by the monitoring apparatus to generate the image information on the photographic subject and the signal.

The autonomous operation controller of the autonomous operation control system according to the above aspect further includes a storage device that stores the image information photographed by the shooting unit and an external storage device.

According to the autonomous operation control system according to the above aspect, images photographed by the shooting unit are classified according to recording time and stored in the storage device or the external storage device provided at a different location, and a specific person is allowed to view the image data through an authentication function.

The autonomous operation controller of the autonomous operation control system according to the above aspect transmits a signal based on the image from the monitoring apparatus and information from a sensor, and gives an instruction to a subject based on the signal.

The autonomous operation controller of the autonomous operation control system according to the above aspect further includes a control function of controlling the photographic subject by the shooting unit to dynamically determine a photographic direction using the image information acquired from a plurality of locations; and a simultaneous photographing function of photographing the photographic subject from the multiple directions simultaneously.

The autonomous operation controller of the autonomous operation control system according to the above aspect further includes a plurality of monitoring apparatuses disposed on a site of the photographic subject, and a function of performing overall control of the shooting units and sensors through the Internet.

The autonomous operation controller of the autonomous operation control system according to the above aspect connects a plurality of monitoring apparatuses through a wireless local area network, and sets the monitoring apparatus as a relay point to constitute a communication network for all the monitoring apparatuses.

The autonomous operation controller of the autonomous operation control system according to the above aspect further includes a function of collecting information on the photographic subject by giving an instruction to the monitoring apparatuses disposed at a plurality of locations to photograph same location simultaneously and to photograph the photographic subject from the multiple directions or to zoom in the photographic subject by using a zoom lens.

BEST MODE FOR CARRYING OUT THE INVENTION

Figure 1:
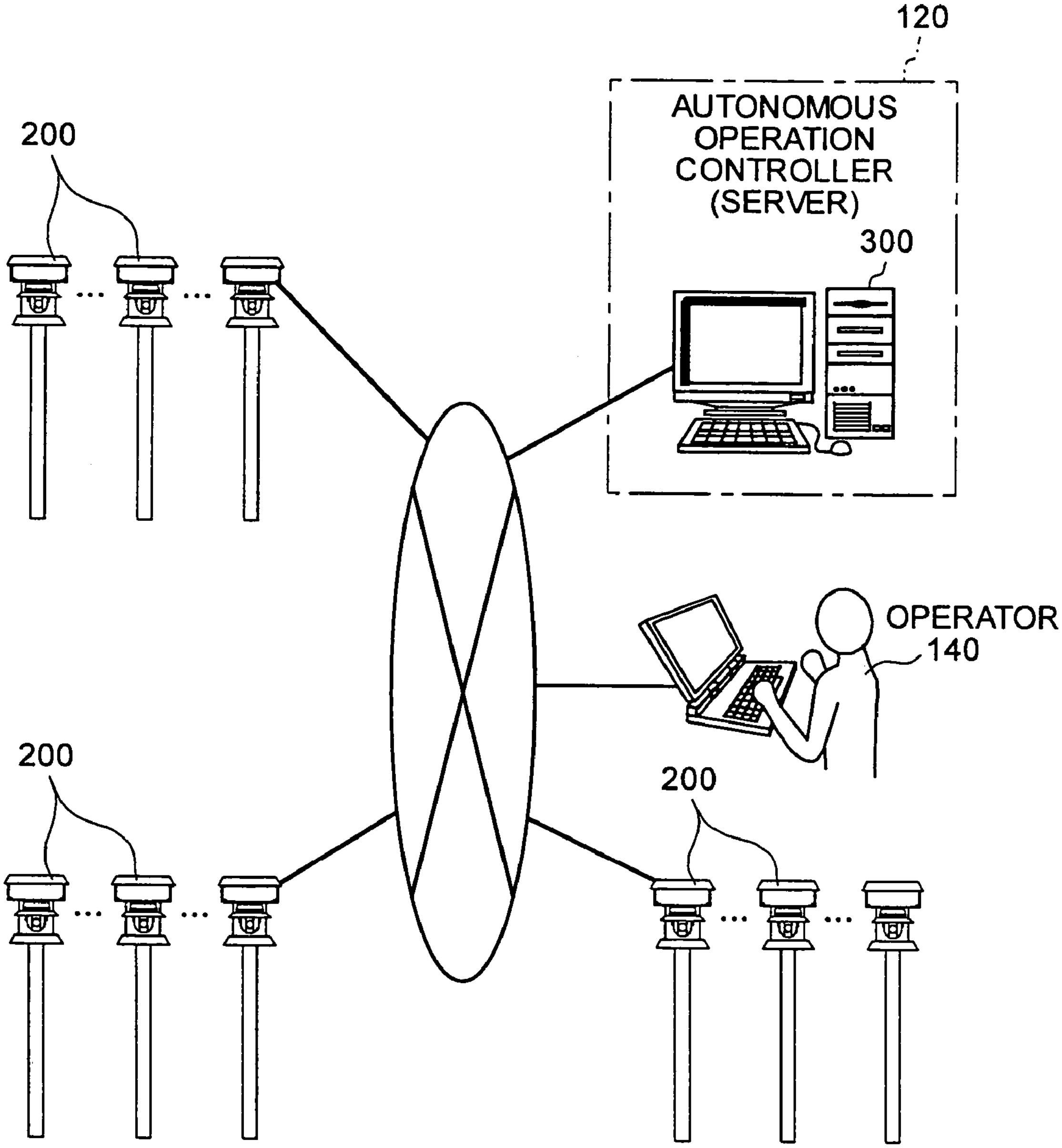
FIG. 1 is a system block diagram of a schematic configuration of an autonomous operation control system that includes a monitoring apparatus according to a first embodiment of the present invention.
Figure 2:
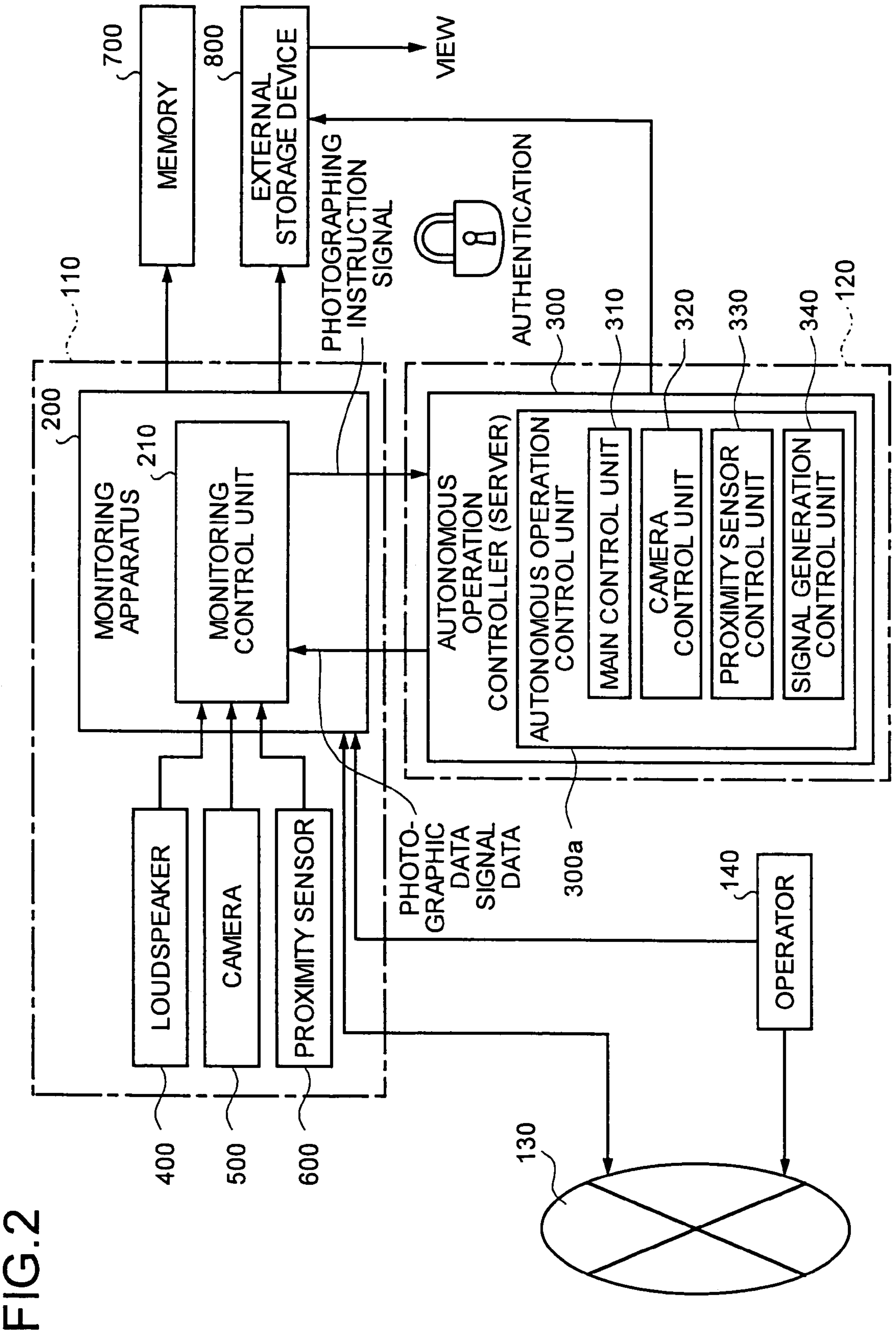
FIG. 2 is a functional block diagram of an overall configuration of the autonomous operation control system that includes the monitoring apparatus according to the first embodiment.

An outline and features of an autonomous operation control system that includes a monitoring apparatus according to the present invention will first be explained with reference to FIG. 1. FIG. 1 is a system block diagram of a schematic configuration of an autonomous operation control system that includes an autonomous operation apparatus according to a first embodiment of the present invention. FIG. 2 is a functional block diagram of an overall configuration of the autonomous operation control system that includes the autonomous operation apparatus.

As shown in FIG. 1, the autonomous operation control system is composed by a plurality of monitoring apparatuses 200 disposed at a first remote location 110 (FIG. 2) and an autonomous operation controller 300 disposed at a second remote location 120. The monitoring apparatuses 200, a terminal device operated by an operator 140, and the autonomous controller 300 are communicably connected to one another by the Internet 130 through either wire or wireless.

Namely, the autonomous operation control system according to the present invention is featured as follows. The monitoring apparatuses 200 are provided at the first remote location 110. The autonomous operation controller (agent server) 300 is provided, as a server, at the second remote location 120. This autonomous operation controller 300 controls a control program (an agent program) for managing and operating an image measuring unit to operate to thereby allow the agent to perform photographing. In this embodiment, by providing such a complicated processing on the agent side (the second remote location 120 side), it suffices to incorporate only simple firmware into a camera 500 of each monitoring apparatuses 200 provided at the first remote location 110. Therefore, the autonomous operation controller 300 performs the complicated and advanced processing and determines a situation, whereby the camera 500 disposed in each monitoring apparatus 200 can be efficiently, accurately operated.

Specifically, as shown in FIG. 2, each monitoring apparatus 200 is disposed at the first remote location 110, and is composed by a monitoring control unit 210 that controls entirety of the monitoring apparatus 200, a loudspeaker 400 that makes sounds such as an unpleasant noise or an alarm sound, the camera 500, and a proximity sensor 600.

Figure 3:
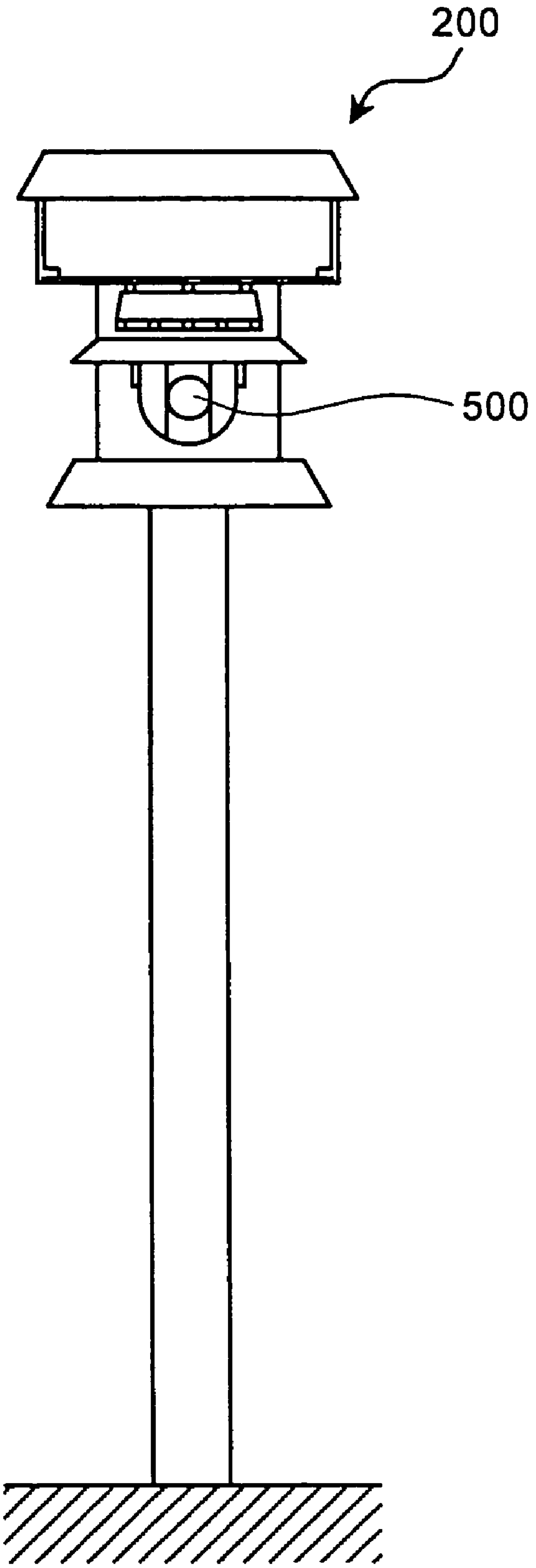
FIG. 3 is an overall block diagram of an external view of the monitoring apparatus according to the present invention.

As shown in FIG. 3, the camera 500 is provided in a front surface portion of the monitoring apparatus 200. This camera 500 has a photographing function of photographing a photographic subject, and a function of photographing various conditions (a photographing point, a brightness, a resolution, etc.) for the camera 500 by remotely operating the camera 500 by the autonomous operation controller 300 disposed at the second remote location, according to the situation. Image information photographed by this camera 500 is collected by the autonomous operation controller 300, and the collected image information is stored in a memory 700 (FIG. 2). As will be explained later, the image information stored in this memory 700 that serves as a storage unit is distributed (provided) following authentication.

At the second remote location 120 remote from this first remote location 110, the autonomous operation controller 300 having a function of mainly operating the camera 500 disposed in each monitoring apparatus 200 is provided. This autonomous operation controller 300 includes a main control unit 310, a camera control unit 320, a proximity sensor control unit 830, and a signal generation control unit 340. Among these constituent elements, the main control unit 310 has a function of generalizing entire control functions of the autonomous operation controller 300. The camera control unit 320 has a function of operating the camera 500 of each monitoring apparatus 200 by remote control, and photographing the photographic subject. The proximity sensor control unit 330 has a function of operating the proximity sensor 600 by remote control, and photographing the photographic subject.

Furthermore, the signal generation control unit 340 has a function of generating an unpleasant noise, an alarm, a flash or the like, a communication signal (a sound generator, flashing a light, a buzzer or the like) for communicating to a person in the neighborhoods, a laser light for detecting an intruder, and a signal source (for ultrasonic waves or electromagnetic waves) for measuring the Doppler effect as well as a distance to the target, a wind direction, and a wind velocity using a radar or a sonar.

Reference numeral 140 denotes the operator who operates the terminal device. This operator 140 can operate the terminal device in conditions in which it is difficult for the autonomous operation controller 300 to make a determination. Specifically, the operator 140 can make a determination based on the image information and the sensor information acquired by the monitoring apparatuses 200 at the first remote location 110, and complement the agent function of the autonomous operation controller 300.

The memory 700 has a function of storing the image information. This memory 700 can protect privacy from human right protection since an authentication function can prohibit public viewing of the image information. In addition, the prohibition can be lifted in response to a judicial permission or the like, so that this image information can be used as investigation data or an exhibit. An external storage device 800 has a function as an auxiliary storage device that enables viewing the image information or the like upon authentication.

Meanwhile, it is difficult to dispose many monitoring apparatuses 200 outdoor (e.g., on a farm land) just for photographing using the cameras 500. Therefore, each monitoring apparatus 200 is made to simultaneously serving a function of monitoring animals and plants, a function of observing weather, and a function as a garden light or a street light and to integrate these functions. It is thereby possible to dispose the monitoring apparatuses 200 at many points, at which photographic subjects are present, other than the open air such as the farm land.

As explained above, in the autonomous operation control system according to the present invention, the autonomous operation controller 300 exercises advanced control. Therefore, the autonomous operation controller 300 can make determinations as to a vast database acquired by the photographic subjects or the like and advanced calculations. For example, after the photographic subject is set or changed by manual remote control through the Internet 130, the autonomous operation controller 300 can perform automatic photographing based on the program set in advance. In addition, since it is unnecessary to mount a highly advanced computer for controlling operation of each camera 500, it is possible to perform long-time outdoor photographing. Furthermore, the autonomous operation control system according to the present invention is useful when image information, measurement information, and the like on the photographic subject at a remote location or the like is managed. The autonomous operation control system according to the present invention can be made effective use of particularly as a system that can easily acquire the image information and the measurement information by remote control.

Figure 4:
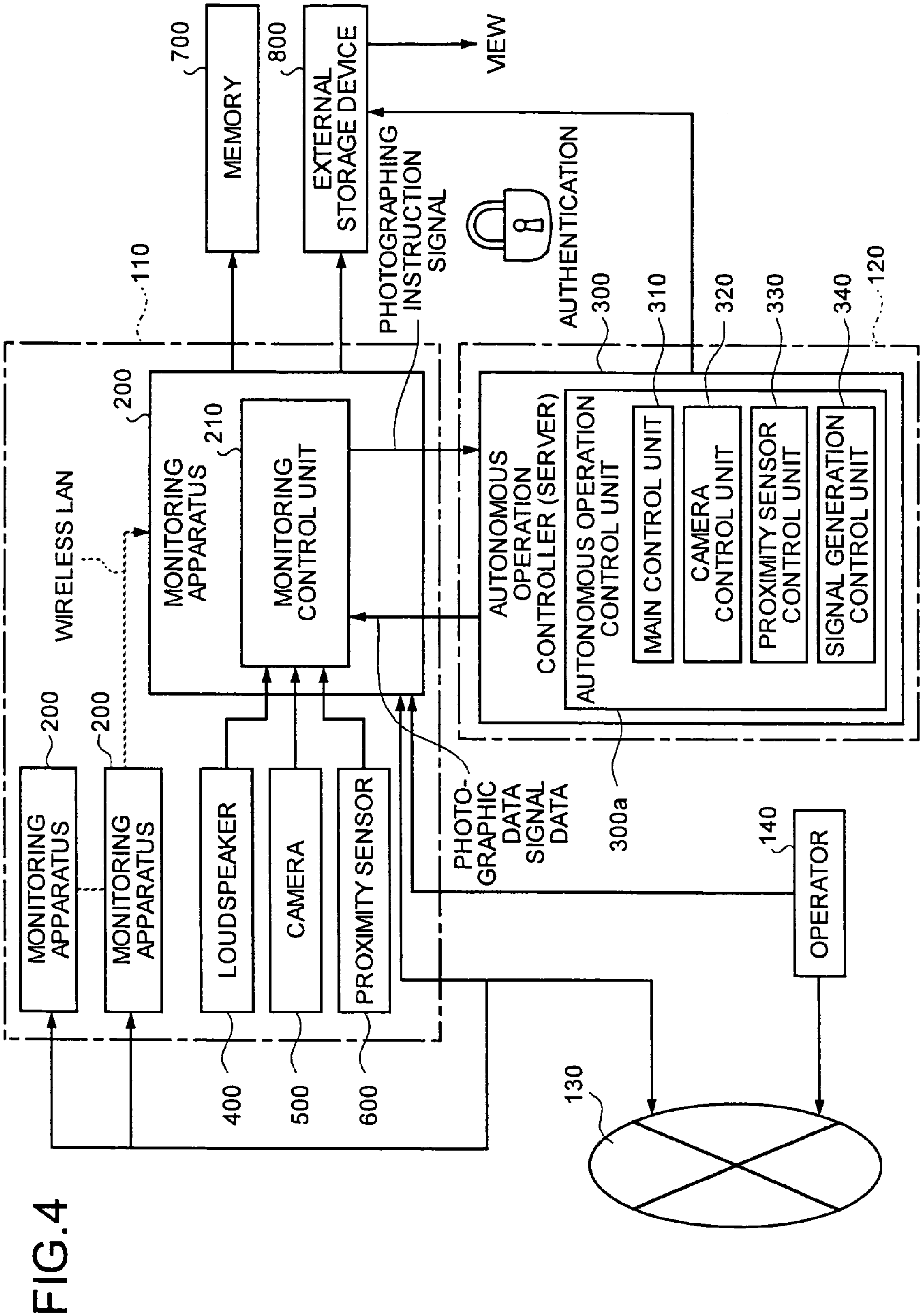
FIG. 4 is a functional block diagram of an overall configuration of an autonomous operation control system that includes a monitoring apparatus according to a second embodiment.

An autonomous operation control system according to a second embodiment of the present invention will be explained. Specifically, as shown in FIG. 4, the autonomous operation control system according to this second embodiment is featured as follows. A communication network for all the monitoring apparatuses 300 is constituted by connecting a plurality of monitoring apparatuses 300 to one another over a wireless LAN and setting the respective monitoring apparatuses 300 as relay points. According to the second embodiment, communications of the monitoring apparatuses 300 can be controlled in a wide range, and an efficient autonomous operation system can be constituted.

Furthermore, if many monitoring apparatuses 300 are disposed, the relay points can be dynamically changed. Due to this, even if a communication on a line is shut off halfway by an accident, a destructive activity, or the like, the autonomous operation controller dynamically changes the path using the normally operating, monitoring apparatuses 300 as new relay points, thereby making it possible to acquire monitoring data such as an image from the other normally operating monitoring apparatuses 300.

Figure 5:
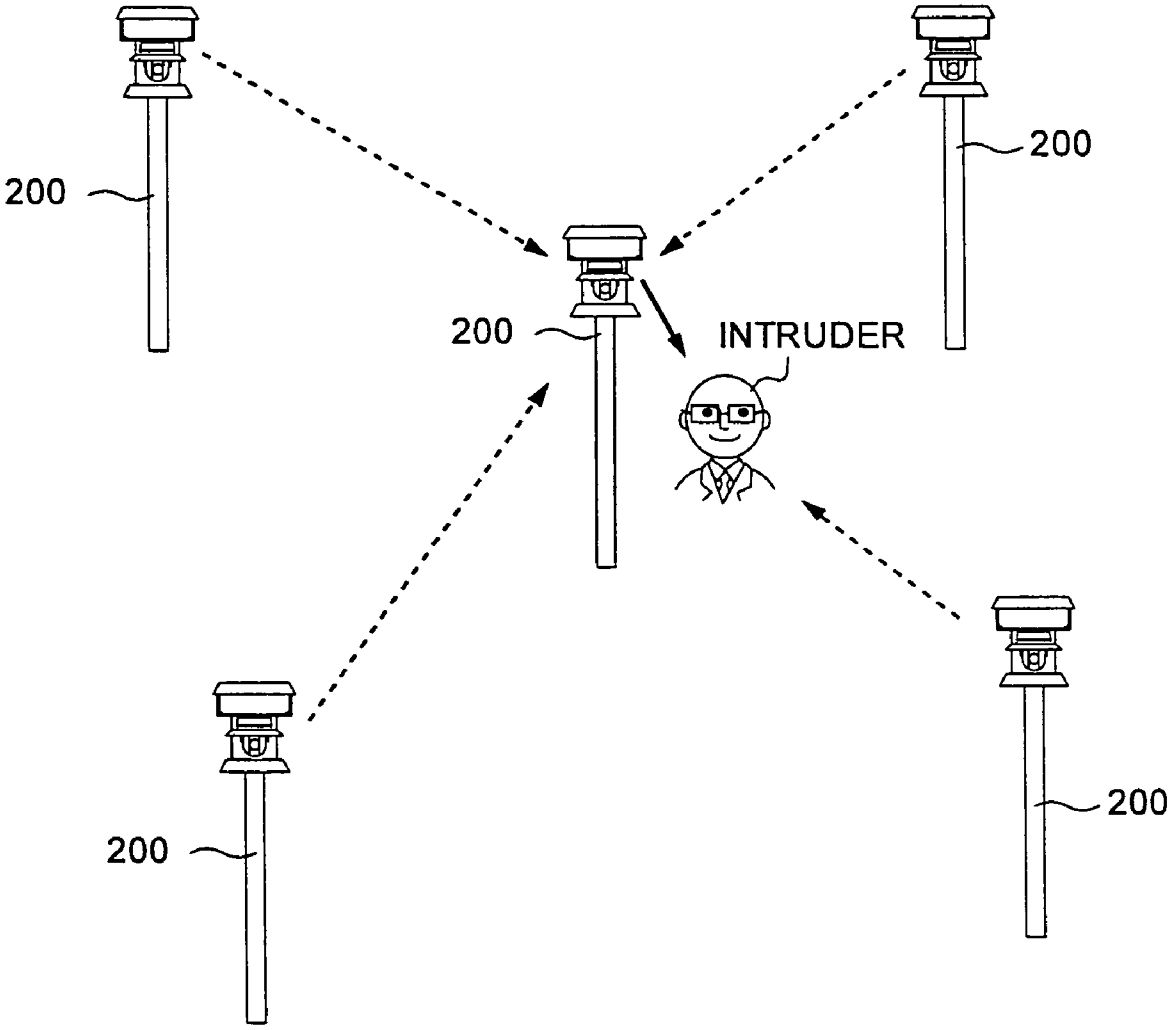
FIG. 5 is an example of a configuration in which the monitoring apparatus photographs an intruder.

An autonomous operation control system according to a third embodiment of the present invention will be explained. According to the third embodiment, the camera 500 provided in each monitoring apparatus 200 has a zoom function of macro-photographing a photographic subject. Namely, the autonomous operation control system according to the present invention can be also applied to crime prevention and alarming system for preventing crimes or the like. FIG. 5 is an overall explanatory view for explaining an example in which the autonomous operation control system according to the present invention is used as the crime prevention and alarming system. Namely, FIG. 5 is an example of disposing five monitoring apparatuses 200 at respective locations intended for prevention of crimes. Each monitoring apparatus 200 includes the proximity sensor 600 and the camera 500 having the zoom function. In this example, a site on which the monitoring apparatus 200 disposed at the center, among the five monitoring apparatuses 200, detects that an intruder approaches. In this example, as shown in FIG. 5, when the proximity sensor 600 (distance sensor) of the central monitoring apparatus 200 detects that an intruder (a human) approaches, the camera 500 is directed toward a central direction and the cameras 500 of the monitoring apparatuses 200 simultaneously start photographing (zoom photographing).

If the photographic subject (intruder) is, for example, a thief of agricultural products or the like, features of this thief can be photographed from multiple directions in detail. In addition, even if the thief runs away, the monitoring apparatuses 200 other than the central monitoring apparatus 200 can simultaneously photograph the thief from multiple directions the instance the thief approaches the respective proximity sensors 600. Furthermore, image information on the intruder or the like photographed by the cameras 500 of these respective monitoring apparatuses 200 can be stored, as image information, in the memory 700 (FIG. 1). The authentication function can prohibit public viewing of this image information, so that privacy can be protected with a view to human right protection. Besides, by lifting the prohibition by a judicial permission or the like, this image information can be used as investigation data and an exhibit.

Figure 6:
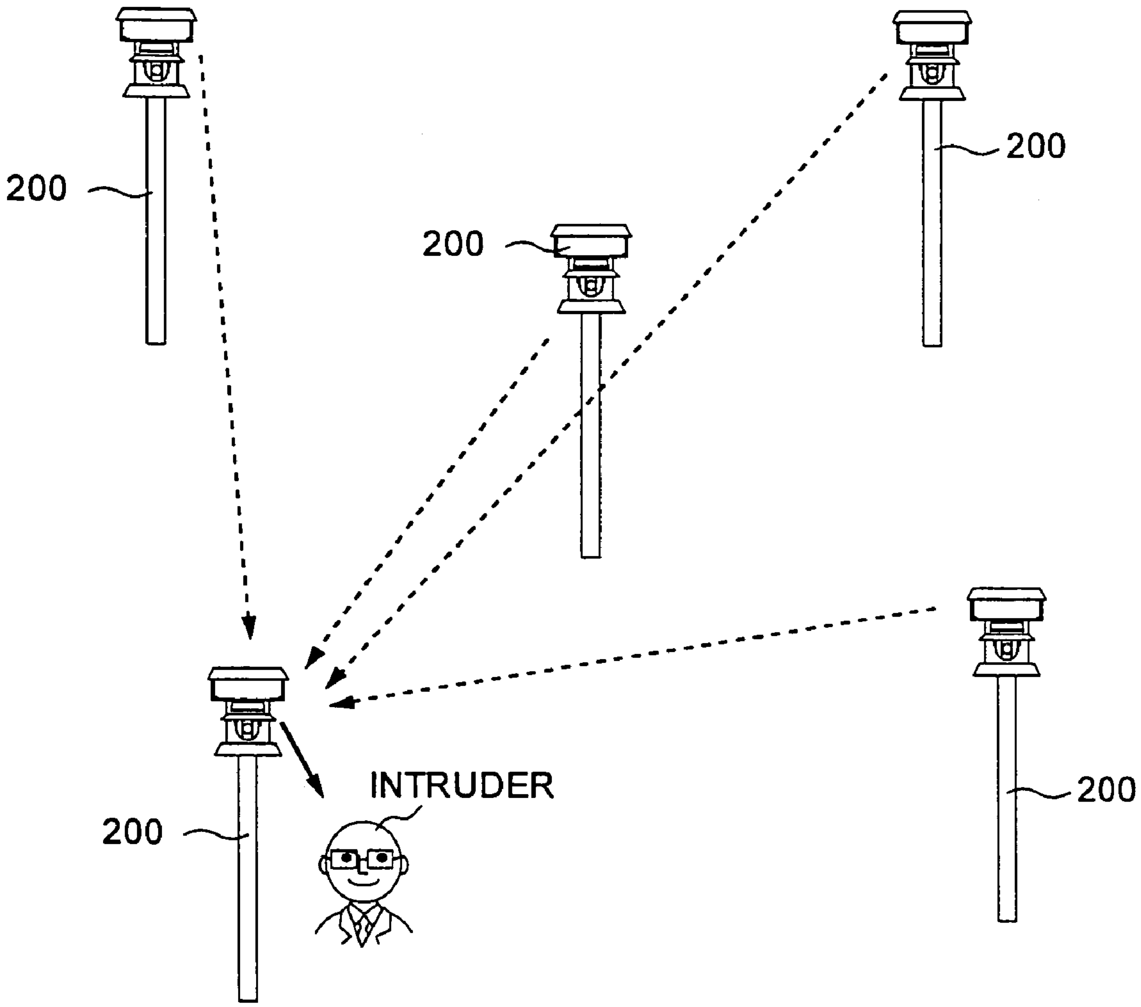
FIG. 6 is an example of a configuration in which a plurality of monitoring apparatuses photograph an intruder.
Figure 7:
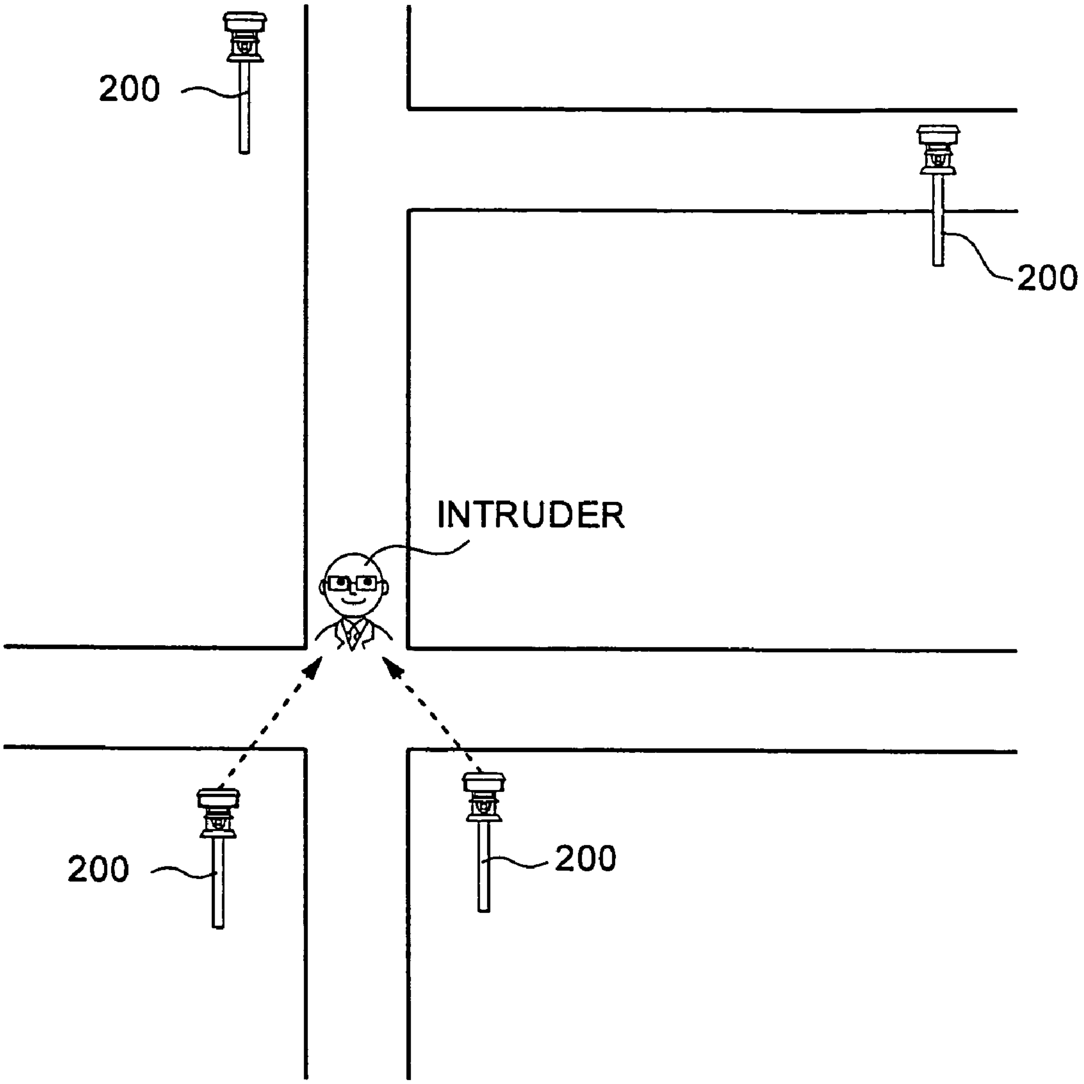
FIG. 7 is an example of a configuration in which a monitoring apparatus having a zoom function photographs an intruder.

FIG. 6 is an example of a site on which the proximity sensor 600 included in the lower left monitoring apparatus 200 detects that an intruder approaches. FIG. 7 is an example in which an intruder moving on the road is photographed by a plurality of monitoring apparatuses 200 on a moving course while supplementing one another. As can be seen, in this embodiment, the cameras 500 of the respective monitoring apparatuses 200 are directed toward a direction in which the intruder is present, and simultaneously perform photographing (zoom photographing).

Meanwhile, there is conventionally known a crime prevention system that photographs image information on a photographic subject successively with operation of a human body sensor and that sets off an alarm. The conventional system has, however, the following disadvantages such as: to operate indiscriminately when the sensor responds; incapable of making advanced determinations; and may be outwitted by an intruder because of its monotonous operations.

By allowing not each monitoring apparatus 200 including the camera 500 but the autonomous operation controller 200 to make determination using a communication function that the autonomous operation control system of the present invention retains, advanced determination can be made.

Furthermore, while it is difficult to completely eliminate malfunctions of the system by autonomous operation based on the sensors, it is also expensive and difficult to always station persons on sites. According to the autonomous operation control system of the present invention, the operator 140 is set standby on the autonomous operation controller 300 (server) side and the operator 140 can make a final check visually. The operator can be engaged in the final check operation wherever accessible to the Internet 130.

Therefore, the operator can be stationed in a place where prices and personnel costs are low. Accordingly, the user of the present invention can make use of the final check operation as an additional service at a low cost. By incorporating the final check made by the operator 140 into the autonomous operation control system as the additional service, a highly reliable crime prevention system can be constructed.

Moreover, each camera 500 according to the third embodiment has the zoom function of macro-photographing the photographic subject. Therefore, it is possible to read patterns of clothes of the intruder as well as lines and stains on a skin surface of the intruder in detail, based on the detailed image information photographed by this zoom function. The intruder can be thereby authenticated. Accordingly, since the image information thus photographed is clear evidence at a court of justice or the like, it is possible to expect that the autonomous operation control system according to the present invention can be effectively used as the crime prevention system. Moreover, the autonomous operation control system according to the present invention can classify pieces of image information photographed by directing the cameras 500 included in the monitoring apparatuses 200 in respective directions, according to photographic directions, magnifications (zoom), or the like, automatically classify the pieces of image information, or classify them according to photographic dates so that the user can view the respective pieces of image information as moving images by fast forward.

In the autonomous operation control system according to the present invention, the autonomous operation controller 300-side agent accesses and reads the image information and sensor values to thereby grasp the situation. The functions (making sounds, turning on a light, etc.) provided in the system are operated by the autonomous operation controller 300 according to the situation to perform photographing. The photographing result can be transferred to the autonomous operation controller 300 and disclosed by an authentication system.

If the photographic subject of the cameras 500 is, for example, tourists, a souvenir photograph of the tourists can be taken from multiple directions simultaneously. Therefore, even if the tourists travel without carrying a camera or do not have a tripod, the tourists can be photographed at an excellent photographing point by using the autonomous operation control system of the present invention. As already explained, the autonomous operation controller 300 in the autonomous operation control system of the present invention has the authentication control function. Therefore, this authentication control function can prohibit those other than the user or the operator from viewing the image information. Besides, the viewing of the image information by the authentication control function can be provided as a paid service.

Furthermore, for amusements such as a labyrinth, a hiking, and a stamp-rally, the monitoring apparatuses 200 are disposed at important positions such as passing points and a goal, respectively, and pictures of participants and souvenir pictures of the participants with scenery for a background can be taken from a remote location using the present system. It is thereby possible to use the photographed images in place of stamps for the stamp-rally or to use them like outdoor photo stickers taken by an instant photo sticker machine. The autonomous operation control system according to the present invention includes the authentication function as explained. Therefore, each participant can receive his/her printed image thus taken at an exit or the like using the authentication system or the search system.

The first to the third embodiments of the autonomous operation control system according to the present invention have been explained so far. However, the present invention can be carried out by various other embodiments besides the first to the third embodiments within the scope of the technical spirit defined by the appended claims. Various modifications of these embodiments will be explained below one by one.

According to the first embodiment, the autonomous operation control system is constituted so that each monitoring apparatus 200 includes therein the camera 500 and the proximity sensor 600. The autonomous operation control system according to the present invention may be constituted to include a weather sensor for observing a temperature, a humidity, an amount of solar radiation, and the like, a wireless LAN communication apparatus, a data display web server, an lightening apparatus such as an LED, and the like as well as the camera and the proximity sensor 600. If these are integrated into a monitoring apparatus, the system can be used for weather observation, lightning such as a garden light or a street light, and kymography for animals and plants.

The autonomous operation control system according to the present invention can be applied to a system that conducts a visual search by combining indexes such as a machine type of the camera, a location, and a time with continuous display of images (pseudo-animation) so as to find a desired image from necessary image information.

The autonomous operation control system according to the present invention can realize a method of preventing a malfunction in alarming, photographing, or the like by using the image information acquired by the operator 140 (FIG. 1) from the autonomous operation controller 300 and the information obtained by the sensors, and providing a process of making determinations and interventions relating to the operation of the autonomous operation control system of the present invention.

The autonomous operation control system according to the present invention can exercise control for transmitting a signal based on the image information from the monitoring apparatuses 200 and the information from the proximity sensors 600, and for issuing an instruction to the photographic subject based on the signal. For example, this autonomous operation control system can give an alarm to the photographic subject to leave the location immediately, if the target is an intruder.

The autonomous operation control system can offer guidance such as "pears just in season are beyond here" or "pears in here are just in season" to visitors who pick pears from trees at a tourist farm when they are passing through a certain point.

Furthermore, at an archaeological site, for example, the autonomous operation control system can explain tourists the origin of the archaeological site or the like by providing guidance.

For photographing of a photo sticker or the like, the autonomous operation control system of the present invention can given an instruction to visitors by offering guidance such as "photographing of a photo sticker of yours now starts", "photographing is over", or "photo stickers taken just now can be purchased at 200 yen each at the entrance".

For souvenir photographing at sights, for example, if photographed images are marketed as souvenir photographs (printed on paper, dishes, mugs, or the like as the hard copies), the autonomous operation control system of the present invention can given an instruction by offering guidance such as "your souvenir photograph can be taken at this spot", "photographing is over", or "souvenir photographs taken just now can be purchased at 100 yen each at the exit". If images photographed by the camera 500 are not offered to the photographic subject at the spot but a right of viewing the images on a website is marketed, the autonomous operation control system of the present invention can give notification by offering guidance such as "you can take a souvenir photograph at this spot", "photographing is over", "you can view the images photographed right now any time on the Internet", or "a card on which a URL, an ID, and a password are written can be purchased at the exit".

The autonomous operation control system according to the present invention can be applied to a food traceability system. Specifically, photographing and measurement relating to a series of field work such as pesticide spraying are performed using the camera 500 included in each monitoring apparatus 200. By doing so, every consumer can check whether a vegetable with reduced pesticide application was actually produced by pesticide-reduced cultivation by viewing the image information recorded in the memory 700 (storage device) by fast forward.

An example of a process from cultivation of an agricultural product until this agricultural product arrives at a home will be explained. The autonomous operation controller 300 in the autonomous operation control system according to the present invention can execute the following procedures: (1) The autonomous operation controller 300 controls the camera 500 to photograph and measure a cultivation history of a certain agricultural product at a point A at certain intervals as image and environment sensing information. At this step, the agricultural product is photographed at multiple magnifications; (2) An operation for containing the agricultural product in a transport container during harvesting is photographed and measured by the other sensor at a point B; (3) An operation of loading the transport container in a truck at the point B is photographed and measured using the other sensor at a point C; (4) Within the truck loaded with the agricultural product, the agricultural product is photographed in a normal manner and measured using the other sensor; (5) When the transport container is unloaded from the truck, the agricultural product is further photographed and measured using the other sensor at the point C; and (6) Thereafter, the agricultural product is measured at dealers, at a greengrocery counter of a supermarket, at a checkout counter of the supermarket, within a refrigerator in a house, and at a cooking point. The agricultural product is measured on a dining table set as a final point n using the photographic and other sensors. Information on the purchased agricultural product is assumed to be photographed and measured at the respective points by the procedures (1) to (6) according to the present invention. At this time, if the user notices degradation in a quality of the agricultural product such as taste, the image information stored in the memory 700 is searched. In addition, it is possible to promptly provide the images ranging from the image at the point n until the image at the point A or the other sensing information. The information can be thereby used as information to investigate at which point the quality degradation occurred.

Furthermore, the autonomous operation controller according to the present invention includes a plurality of control instruction groups (script or rule basis) that respectively exercise different controls executed by the autonomous operation controller to correspond to a certain different operations. In addition, the autonomous operation controller includes a function of recording these control instruction groups in an arbitrary storage device connected to the network. If so, a plurality of different operations can be performed by the control instruction groups.

Alternatively, the autonomous operation controller according to the present invention can include a function of inputting and editing the control instruction groups at a remote location through the Internet. Namely, if image information is used for different purposes by different users, different installation locations, or the like, the autonomous operation controller needs to exercise different autonomous operation controls, respectively. Specifically, a user A needs "a monitoring function of photographing a person when he/she comes in", a user B requests "a light to be turned on only at nighttime", and a user C requests "preset four parts to be photographed at different magnifications for a certain time". Thus, the control instruction groups differ. If so, a plurality of control instruction groups needs to be prepared for autonomous operation control. If the number of users having different requests (different control instruction groups) as explained above increases, it is difficult for a system administrator of the autonomous operation control system or controller to collectively, manually input and edit the control instructions. As already explained, the autonomous operation controller of the present invention includes the function of inputting and editing the control instructions at the remote location through the Internet. The user can thereby add a network service for inputting and editing by operation on the web server or an electronic mail or the like, whereby the autonomous operation control system that can promptly satisfy diverse needs can be realized.

Furthermore, the autonomous operation control system according to the present invention includes the function of allowing control instructions generated in advance to be dealt with as one macro instruction. In addition, by further combining a plurality of macro instructions, the autonomous operation control system that can handle more complicated autonomous operation control can be realized.

Specifically, it is assumed that a control instruction to perform "a monitoring function of photographing a person when he/she comes in" is generated for the user A, a control instruction to "turn on a light according to an intensity of solar radiation" is generated for the user B, and a control instruction to "photograph a preset point at a specific magnification at specific time intervals" is generated for the user C. By allowing those other than the users A to C to combine these control instructions, it is possible to execute more complicated autonomous operation control.

According to the present invention, the autonomous operation controller can perform complicated processings. Therefore, the present invention exhibits the following advantages. It suffices to incorporate simple firmware into the camera 500 of each monitoring apparatus. The autonomous operation controller (server) 300 can perform complicated and advanced processings and determine the situations, thereby operating the camera 500 disposed in each of these monitoring apparatuses.

Furthermore, according to the present invention, the agent includes the complicated processings. Therefore, the present invention exhibits the following advantages. It suffices to incorporate simple firmware into the camera 500 of each monitoring apparatus. The autonomous operation controller 300 can perform complicated and advanced processings and determine the situations, thereby efficiently and accurately operating the camera 500 disposed in each of these monitoring apparatuses 200.

Moreover, according to the present invention, the communication network can be constituted by connecting the monitoring apparatuses 300 to one another over the wireless LAN, and by setting the respective monitoring apparatuses 300 as relay points. If so, communications of the monitoring apparatuses 300 can be controlled in a wide range, and an efficient system can be constructed.

INDUSTRIAL APPLICABILITY

As explained above, the autonomous operation control system according to the present invention is useful when managing the image information, the measurement information, and the like on the photographic subject at the remote location or the like, and more particularly, suitable for an autonomous operation control system that can easily acquire the image information and the measurement information based on an autonomous operation by remote control.

The invention claimed is:

1. An autonomous operation control system comprising:

a monitoring apparatus that is provided at a first remote location, and acquires image information on a photographic subject, the monitoring apparatus including a shooting unit that performs shooting of the photographic subject;

a photographic-subject detecting unit that detects the photographic subject; and a signal generating unit that generates a plurality of signals, the plurality of signals includes an unpleasant noise, an alarm, a flash, a communication signal for communicating to a person in a neighborhood, a laser light for detecting an intruder, and a signal source for measuring the Doppler effect as well as a distance to a target, a wind direction, and a wind velocity using radar or sonar; and an autonomous operation controller that is provided at a second remote location, and remotely controls the monitoring apparatus, wherein the autonomous operation controller includes a function of automatically operating a plurality of shooting units and a plurality of signal generating units based on photographic information acquired by the monitoring apparatus to photograph an image and generate a signal, wherein the monitoring apparatus further includes a function of monitoring animals and plants, a function of observing weather, and a function as a garden light or a street light.

2. The autonomous operation control system according to claim 1, wherein, when a target that intrudes in a photographic subject area is detected, the shooting unit zooms in the target from multiple directions using a zoom function.

3. The autonomous operation control system according to claim 1, wherein the autonomous operation controller automatically operates the shooting units and the signal generating units based on photographic data and signal data acquired by the monitoring apparatus to generate the image information on the photographic subject and the signal.

4. The autonomous operation control system according to claim 1, wherein the autonomous operation controller further includes a storage device that stores the image information photographed by the shooting unit and an external storage device.

5. The autonomous operation control system according to claim 1, wherein images photographed by the shooting unit are classified according to recording time and stored in a storage device or an external storage device provided at a different location, and a specific person is allowed to view the image data through an authentication function.

6. The autonomous operation control system according to claim 1, wherein the autonomous operation controller transmits a signal based on the image from the monitoring apparatus and information from a sensor, and gives an instruction to a subject based on the signal.

7. The autonomous operation control system according to claim 1, wherein the autonomous operation controller further includes a control function of controlling the photographic subject by the shooting unit to dynamically determine a photographic direction using the image information acquired from a plurality of locations; and a simultaneous photographing function of photographing the photographic subject from the multiple directions simultaneously.

8. The autonomous operation control system according to claim 1, wherein the autonomous operation controller further includes a plurality of monitoring apparatuses disposed on a site of the photographic subject, and a function of performing overall control of sensors and the shooting units through the Internet.

9. The autonomous operation control system according to claim 1, wherein the autonomous operation controller connects a plurality of monitoring apparatuses through a wireless local area network, and sets the monitoring apparatus as a relay point to constitute a communication network for all the monitoring apparatuses.

10. The autonomous operation control system according to claim 1, wherein the autonomous operation controller further includes a function of collecting information on the photographic subject by giving an instruction to the monitoring apparatuses disposed at a plurality of locations to photograph a same location simultaneously and to photograph the photographic subject from the multiple directions or to zoom in the photographic subject by using a zoom lens.

11. The autonomous operation control system according to claim 1, wherein the autonomous operation controller further includes a plurality of control instruction groups for exercising different controls executed by the autonomous operation controller for different operations, respectively, and a function of recording the control instruction groups in an arbitrary recording device connected to a network.

12. The autonomous operation control system according to claim 11, wherein the autonomous operation controller further includes a function of allowing a system administrator or a user to input the control instruction groups controlled by the autonomous operation controller from a second remote location through the Internet.

13. The autonomous operation control system according to claim 1, wherein the autonomous operation controller further includes a function of handling a group of control instructions generated in advance as one macro instruction, and a function of combining the macro instruction into a plurality of macro instructions to execute.

14. An autonomous operation control system comprising:

a monitoring apparatus that is provided at a first remote location, and acquires image information on a photographic subject, the monitoring apparatus including a shooting unit that performs shooting of the photographic subject;

a photographic-subject detecting unit that detects the photographic subject; and a signal generating unit that generates a plurality of signals, the plurality of signals includes an unpleasant noise, an alarm, a flash, a communication signal for communicating to a person in a neighborhood, a laser light for detecting an intruder, and a signal source for measuring the Doppler effect as well as a distance to a target, a wind direction, and a wind velocity using radar or sonar; and an autonomous operation controller that is provided at a second remote location, and remotely controls the monitoring apparatus, wherein a plurality of the shooting units are prepared in a photographic subject area, and the shooting unit includes a function of collecting information on the photographic subject by, when one of a plurality of monitoring apparatuses detects a target that intrudes in the photographic subject area, photographing the target from multiple directions, tracking and monitoring the target, and zooming-in the photographic subject using a zoom lens, wherein the monitoring apparatus further includes a function of monitoring animals and plants, a function of observing weather, and a function as a garden light or a street light.

15. The autonomous operation control system according to claim 14 wherein, when the target that intrudes in the photographic subject area is detected, the shooting unit zooms in the target from the multiple directions using a zoom function.

16. The autonomous operation control system according to claim 14, wherein the autonomous operation controller automatically operates the shooting unit and the signal generating unit based on photographic data and signal data acquired by the monitoring apparatus to generate the image information on the photographic subject and the signal.

17. The autonomous operation control system according to claim 14, wherein the autonomous operation controller includes a storage device that stores the image information photographed by the shooting unit and an external storage device.

18. The autonomous operation control system according to claim 14, wherein images photographed by the shooting unit are classified according to recording time and stored in a storage device or an external storage device provided at a different location, and a specific person is allowed to view image data through an authentication function.

19. The autonomous operation control system according to claim 14, wherein the autonomous operation controller transmits a signal based on the image from the monitoring apparatus and information from a sensor, and gives an instruction to a subject based on the signal.

20. The autonomous operation control system according to claim 14, wherein the autonomous operation controller includes a control function of controlling the photographic subject by the shooting unit to dynamically determine a photographic direction using the image information acquired from a plurality of locations; and a simultaneous photographing function of photographing the photographic subject from the multiple directions simultaneously.

21. The autonomous operation control system according to claim 14, wherein the autonomous operation controller includes a plurality of monitoring apparatuses disposed on a site of the photographic subject, and a function of performing overall control of sensors and the shooting units through the Internet.

22. The autonomous operation control system according to claim 14, wherein the autonomous operation controller connects a plurality of monitoring apparatuses through a wireless local area network, and sets the monitoring apparatus as a relay point to constitute a communication network for all the monitoring apparatuses.

23. The autonomous operation control system according to claim 14, wherein the autonomous operation controller includes a function of collecting information on the photographic subject by giving an instruction to the monitoring apparatuses disposed at a plurality of locations to photograph same location simultaneously and to photograph the photographic subject from the multiple directions or to zoom in the photographic subject by using a zoom lens.

24. The autonomous operation control system according to claim 14, wherein the autonomous operation controller includes a plurality of control instruction groups for exercising different controls executed by the autonomous operation controller for different operations, respectively, and a function of recording the control instruction groups in an arbitrary recording device connected to a network.

25. The autonomous operation control system according to claim 24, wherein the autonomous operation controller includes a function of allowing a system administrator or a user to input the control instruction groups controlled by the autonomous operation controller from a second remote location through the Internet.

26. The autonomous operation control system according to claim 14, wherein the autonomous operation controller includes a function of handling a group of control instructions generated in advance as one macro instruction, and a function of combining the macro instruction into a plurality of macro instructions to execute.

* * * * *